(12) United States Patent
Tsuruma (10) Patent No.: US 7,708,914 B2
(45) Date of Patent: May 4, 2010

(54) METHOD OF AND APPARATUS FOR PRODUCING MICRO LENS AND MICRO LENS

(75) Inventor: Isao Tsuruma, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1122 days.

(21) Appl. No.: 11/066,533

(22) Filed: Feb. 28, 2005

(65) Prior Publication Data
US 2005/0191784 A1   Sep. 1, 2005

(30) Foreign Application Priority Data
Feb. 27, 2004   (JP)   ............................. 2004-053536

(51) Int. Cl.
*B29D 11/00* (2006.01)
(52) U.S. Cl. .................. 264/2.5; 264/1.1; 264/1.32; 427/162; 427/164
(58) Field of Classification Search ............. 264/1.1, 264/1.32, 1.27, 1.24, 1.36, 1.7, 2.7; 427/335, 427/162, 164
See application file for complete search history.

(56) References Cited

U.S. PATENT DOCUMENTS 4,689,291 A   8/1987   Popovic et al.
6,404,555 B1   6/2002   Nishikawa
6,432,328 B2 *   8/2002   Hamanaka et al. ......... 264/1.36
2002/0045028 A1   4/2002   Teshima et al.
2002/0045285 A1   4/2002   Ushijima et al.

FOREIGN PATENT DOCUMENTS

| DE | 197 12 297 A1 | 10/1998 |
| JP | 59-147586 A | 8/1984 |
| JP | 9-122573 A | 5/1997 |
| JP | 2000-332226 A | 11/2000 |
| JP | 2003-287603 | 10/2003 |

OTHER PUBLICATIONS

Darhuber, Anton A. Sandra M. Troian, Jeffre M. Davis, and Scott M. Miller, "Selective Dip-coating of Chemically Micropatterned Surfaces", Journal of Applied Science, Nov. 1, 2000, vol. 88, No. 9, pp. 5119-5126.*
Erdmann L et al., "Technique for Monolithic Fabrication of Silicon Microlenses With Selectable Rim Angles", Optical Engineering, Soc. of Photo-Optical Instrumentation Engineers. Bellingham, US, vol. 36, No. 4, Apr. 1997, pp. 1094-1098, XP000700919.

* cited by examiner

*Primary Examiner*—Christina Johnson
*Assistant Examiner*—Galen Hauth
(74) *Attorney, Agent, or Firm*—Sughure Mion, PLLC (57) ABSTRACT

The steps of producing a micro lens comprises the steps of forming a resin layer on a substrate in a desired pattern, causing the resin layer to absorb from its surroundings solvent which dissolves the resin so that the resin layer has fluidity and the surface of the resin layer becomes convex under the surface tension, and then drying the solvent.

20 Claims, 7 Drawing Sheets

METHOD OF AND APPARATUS FOR PRODUCING MICRO LENS AND MICRO LENS

BACKGROUND OF THE INVENTION

1. Field of the Invention

This invention relates to a method of and an apparatus for producing a micro lens. This invention further relates to a method of forming a mold (mother) for forming the micro lens.

2. Description of the Related Art

In a solid state image taking device such as a CCD image sensor, a micro lens for increasing light collecting efficiency is provided corresponding to each of a plurality of photodetector elements such as a photodiode. Usually, the micro lenses form a micro lens array comprising a plurality of two-dimensionally arranged micro lenses, and the micro lens is often used in the form of a micro lens array.

Further, the micro lens array is often used in a display and an image exposure system as a spatial light modulator element as well as the solid state image taking device. In Japanese Unexamined Patent Publication No. 2000-332226, an example of the micro lens array of this type is disclosed.

Though there have been proposed various methods of producing the micro lenses, methods in which the surface tension of the lens material is prevailing from the viewpoint of facilitation of formation of curved face of the lens. In Japanese Unexamined Patent Publication No. 59(1984)-147586, there has been disclosed a method in which a thermoplastic resin pattern is formed on an solid state image taking device and a micro lens is formed by fusing the thermoplastic resin pattern, as an example of such methods. Further, in Japanese Unexamined Patent Publication No. 9(1997)-122573, a method in which a low contact angle area and a high contact angle area are formed on a substrate, and a lens is formed by causing a coating solution (the lens material) to selectively adhere to the low contact angle area on the basis of the difference in wettability between the low contact angle area and the high contact angle area.

In the conventional method in which a lens is produced by fusing resin, which forms the lens, as described in Japanese Unexamined Patent Publication No. 59(1984)-147586, positive resist has been used in view of the facilitation of patterning. However, since the resist is based on phenolic novolak and accordingly, is thermosetting, setting also gradually progresses in the temperature range of 130 to 160° C. which is the softening range of the resist. Accordingly, there is difficult to form a curved surface as designed in this method. Especially, in the case of a low lens (for instance, a lens which is not smaller than 10 μm in diameter and is not smaller than 100 μm in radius of curvature), the curved surface can be formed only in the periphery of the pattern and the obtained micro lens does not regularly function since the central portion can be solidified before the fluidity of the resist becomes sufficient.

Further, in the method disclosed in Japanese Unexamined Patent Publication No. 9(1997)-122573, it is necessary to uniformly apply the lens material to substrates which are different in wettability. However it is difficult to uniformly apply the lens material when there is unevenness due to the structure on the under side as in the solid state image taking device and fluctuation in shape can increase from lens to lens.

SUMMARY OF THE INVENTION

In view of the foregoing observations and description, the primary object of the present invention is to provide a method of producing a micro lens which can produce the micro lens at high accuracy with ease with fluctuation in the shape minimized even if it is low in height.

A second object of the present invention is to provide a method of producing a mother of a micro lens which is useful to accomplish the above object.

A third object of the present invention is to provide an apparatus for carrying out the above method of producing the micro lens and the method of producing the mother of the micro lens.

In the method of producing a micro lens or the method of producing a mother of a micro lens in accordance with the present invention, a resin layer is caused to absorb its solvent to have fluidity and to become convex under the surface tension without process of fusing the resin. The convex portion of the resin can be used as a lens if the resin is transparent. Otherwise, the convex portion of the resin can be transferred to the substrate on which it is carried and a lens may be formed in the substrate or to the member other than the substrate to form a mother for molding a lens and a lens may be formed by casting therein transparent material.

More concretely, in accordance with the present invention, there is provided a first method of producing a micro lens comprising the steps of forming a transparent resin layer on a transparent substrate in a desired pattern, causing the resin layer to absorb from its surroundings solvent which dissolves the resin so that the resin layer has fluidity and the surface of the resin layer becomes convex under the surface tension, and then drying the solvent to use the convex portion of the resin as a lens.

Further, in accordance with the present invention, there is provided a second method of producing a micro lens comprising the steps of forming a resin layer on a transparent substrate in a desired pattern, causing the resin layer to absorb from its surroundings solvent which dissolves the resin so that the resin layer has fluidity and the surface of the resin layer becomes convex under the surface tension, then drying the solvent, dry-etching the substrate from the side on which the resin remains, thereby transferring the convex shape of the resin layer to the substrate, and forming a lens on the substrate.

In accordance with the second method of producing a micro lens, an aspheric lens can be produced by changing the etching rates of the resin and the substrate by continuously or stepwise changing etching conditions with time during the dry etching.

Further, in accordance with the present invention, there is provided a third method of producing a micro lens comprising the steps of forming a resin layer on a substrate in a desired pattern, causing the resin layer to absorb from its surroundings solvent which dissolves the resin so that the resin layer has fluidity and the surface of the resin layer becomes convex under the surface tension, then drying the solvent, subsequently transferring the convex shape of the resin layer to another member to form a lens forming mold, and forming a lens by molding a transparent member on the basis of the lens forming mold.

In the first to third methods of the present invention, by patterning the (transparent) resin layer into substantially an ellipsoid or a polygon approximated thereto, a lens where the curvature in a cross-section parallel to the optical axis differs depending on the orientation can be produced.

In the first to third methods of the present invention, it is preferred that a plurality of the micro lenses are one-dimensionally or two-dimensionally arranged to form a lens array.

In accordance with another aspect of the present invention, there is provided a method of producing a micro lens forming mold (or a mother for forming a micro lens) comprising the steps of forming a resin layer on a substrate in a desired pattern, causing the resin layer to absorb from its surroundings solvent which dissolves the resin so that the resin layer has fluidity and the surface of the resin layer becomes convex under the surface tension, then drying the solvent, and subsequently transferring the convex shape of the resin layer to another member to form a lens forming mold.

In the method of producing a micro lens forming mold, by patterning the resin layer into substantially an ellipsoid or a polygon approximated thereto, a lens forming mold for forming a lens where the curvature in a cross-section parallel to the optical axis differs depending on the orientation can be produced.

Further, in the method of producing a micro lens forming mold of the present invention, it is preferred that the mold can mold a lens array by forming a plurality of one-dimensionally or two-dimensionally arranged convex portion of the resin.

In the method of producing a micro lens or the method of producing a micro lens forming mold in accordance with the present invention, it is preferred that the surface of the substrate be coated with coating exhibiting liquid repellency to the resin which has absorbed the solvent and has been dissolved, from the resin layer side after forming the resin layer in a desired pattern and before causing the resin layer to absorb the solvent.

When providing with such coating, it is preferred that the resin be held in the atmosphere of the solvent until the coating adhering to the surface of the resin is taken in the inside of the resin when causing the resin layer to absorb the solvent.

Further, it is preferred that the coating comprises fluorine or silicone compound.

Further, when the substrate is of Si or $SiO_2$, it is preferred that the coating be of silane coupling agent of fluorocarbon series.

Further, when the coating described above is provided, it is preferred that the surface of the substrate be treated with a surface treatment with oxygen plasma or ozone before providing the coating.

Further, in the methods of producing a micro lens or the method of producing a micro lens forming mold in accordance with the present invention, it is preferred that the resin be heat-treated to be solidified after the solvent is dried.

In accordance with still another aspect of the present invention, there is further provided with an apparatus for carrying out the above method of producing the micro lens and the method of producing the micro lens forming mold comprising at least a means for holding the substrate carrying thereon the resin layer in a treatment container, and replacing the inside of the container with inert gas or evacuating the inside of the container under vacuum, a means for introducing vapor of the solvent into the container, and a means for drying the solvent absorbed in the resin.

Further, it is preferred that the apparatus be further comprises a means for heating and solidifying the resin after the solvent is dried.

In the first method of producing a micro lens of the present invention, since resin in a predetermined pattern is caused to absorb from its surroundings solvent which dissolves the resin so that the resin has fluidity and the surface of the resin becomes convex and a lens under the surface tension, it is unnecessary to heat the resin and accordingly, the problem that the lens becomes incorrect due to heating of resin can be avoided whereby a micro lens can be produced at a high accuracy. Further, the volume of the resin is increased and the resin becomes more apt to flow due to the fact that the resin absorbs the solvent, even a lens which is low in height can be easily produced. Further, since the resin can be applied to the substrate by spin coating or the like where the thickness can be accurately controlled, the volumes of the lenses which are determined by the lens region patterned, for instance, by photolithography and the thickness of the resin can be accurately controlled and a micro lens array which is less in fluctuation can be produced.

Further, in the second method of producing a micro lens of the present invention, since the portion of the resin which is caused to become a lens shape in the manner as described above in conjunction with the first method is transferred to the substrate and a lens is formed on the substrate, the portion of the resin which is caused to become a lens shape can be easily shaped into even a lens which is low in height at high accuracy with less fluctuation in shape as in the first embodiment of producing a micro lens. Accordingly, the lens formed by transferring the portion of the resin to the substrate can be easily produced at high accuracy with less fluctuation in shape even if the lens is low in height.

Especially, in the second method of producing a micro lens of the present invention, since the portion of the resin caused to become a lens shape is transferred to the substrate by dry-etching and the lens is formed in the substrate, the substrate whose material can be relatively freely selected as compared with the resin whose material is limited due to the steps such as the step of patterning the resin by photolithography can be used as the material of the lens.

Accordingly, a micro lens which is higher in durability and less in light absorption can be produced.

Further, in the third method of producing a micro lens of the present invention, since the portion of the resin which is caused to become a lens shape in the manner as described above in conjunction with the first method is transferred to another member and a lens-forming mold is formed on the member, the portion of the resin which is caused to become a lens shape can be easily shaped into even a lens which is low in height at high accuracy with less fluctuation in shape as in the first embodiment of producing a micro lens. Accordingly, the lens formed by casting a transparent member into the lens forming mold obtained by transferring the portion of the resin to the member can be easily produced at high accuracy with less fluctuation in shape even if the lens is low in height.

Further, in the method of producing a micro lens forming mold of the present invention, since the portion of the resin which is caused to become a lens shape in the manner as described above in conjunction with the first method is transferred to another member and a lens-forming mold is formed on the member, the portion of the resin which is caused to become a lens shape can be easily shaped into even a lens which is low in height at high accuracy with less fluctuation in shape as in the first embodiment of producing a micro lens. Accordingly, the lens forming mold obtained by transferring the portion of the resin to the member can be easily produced at high accuracy with less fluctuation in shape even if the lens is low in height. Accordingly, the lens formed by casting a transparent member into the lens forming mold can be easily produced at high accuracy with less fluctuation in shape even if the lens is low in height.

In the conventional fusing method, since thermosetting resin such as novolak resin has been used, the marginal temperature where the resin has fluidity is narrow, and it has been necessary to accurately control the processing conditions and/or to limit the material. Whereas, in the methods of producing a micro lens or a method of a micro lens forming mold in accordance with the present invention, the lens shape can be easily formed by suitably selecting the resin before solidifying and the solvent which dissolves the resin. Accordingly, the methods of producing a micro lens or a method of a micro lens forming mold in accordance with the present invention is superior to the conventional fusing method in both the freedom in selecting the material and broadness of the margin of the processing conditions.

Further, since the material can be treated under normal temperatures in the methods of producing a micro lens in accordance with the present invention, the problem of color fading due to heat which is apt to occur when micro lenses are formed on a color filter as in on-chip lenses of a CCD can be avoided.

When the surface of the substrate is coated with coating exhibiting liquid repellency to the resin which has absorbed the solvent and has been dissolved, from the resin layer side after forming the resin layer in a desired pattern and before causing the resin layer to absorb the solvent in the method of producing a micro lens or the method of producing a micro lens forming mold in accordance with the present invention, spread of the resin when the resin is dissolved can be prevented, whereby the micro lens or the micro lens forming mold can be more accurately produced.

When providing with such coating, if the resin is held in the atmosphere of the solvent until the coating adhering to the surface of the resin is taken in the inside of the resin when causing the resin layer to absorb the solvent, the coating is prevented from remaining on the surface of lens-like portion of the resin to be transferred to said substrate or said another member whereby deterioration of the lens performance and the adverse influence on transfer by the remaining coating can be prevented.

Further, when the coating described above is provided, if the surface of the substrate is treated with a surface treatment with oxygen plasma or ozone before providing the coating, organic material or the like can be removed from the surface of the substrate, whereby the coating can firmly adhere to the surface of the substrate.

Further, in the methods of producing a micro lens or the method of producing a micro lens forming mold in accordance with the present invention, when the resin is heat-treated to be solidified after the solvent is dried, the micro lens formed by the resin and/or the lens-like portion of the resin to be transferred to said substrate or said another member can be strong.

With the apparatuses of the present invention having the structure described above, the methods of producing a micro lens or the method of producing a micro lens forming mold described above can be efficiently carried out. Further, since the apparatuses of the present invention is provided with a means for holding the substrate carrying thereon the resin layer in a treatment container, and replacing the inside of the container with inert gas or evacuating the inside of the container under vacuum, the step of causing the resin to absorb the solvent can be carried out under an oxygen-reduced atmosphere, whereby even the solvent which is low in flashpoint and/or is explosive can be treated in safety.

DESCRIPTION OF THE PREFERRED EMBODIMENTS

First Embodiment

Figure 1A:
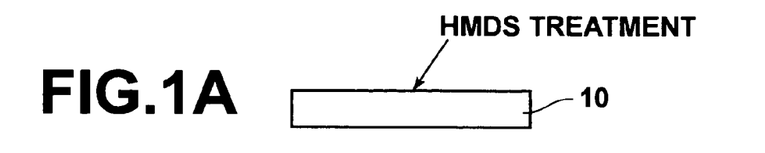
FIGS. 1A to 1G are views for illustrating the steps of a method of producing a micro lens in accordance with a first embodiment of the present invention.
Figure 1B:
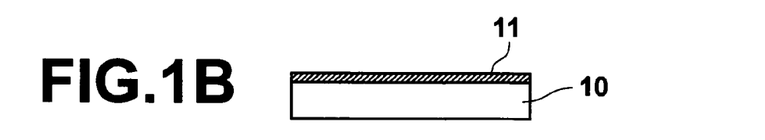

A method of producing a micro lens in accordance with a first embodiment of the present invention will be described with reference to FIGS. 1A to 1G, hereinbelow. A surface of a transparent $SiO_2$ glass substrate 10 is treated with HMDS (hexamethyldisilazane) as shown in FIG. 1A. Then the surface of the substrate 10 is coated with positive resist 11 of phenolic novolak series in a predetermined thickness by spin coating as shown in FIG. 1B. The thickness t of the resist 11 is defined by formula $t=a \cdot V/S$ wherein V represents the desired volume of the lens, S represents the area of a cross-section defined by a desired curved surface of the lens and the substrate surface, and a represents a constant determined by the process, and is controlled by coating conditions such as the viscosity of the resist and the rotational speed of the spin coating.

Then the substrate 10 thus treated is soft-baked for a predetermined time at 80 to 120° C. by the use of a hot plate or a clean oven.

Figure 1C:
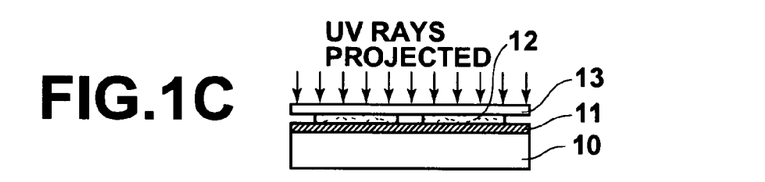

Next, the resist 11 on the substrate 10 is exposed to light by a projecting exposure system or a contact aligner through a photo-mask 13 having a Cr pattern 12 of a closed curve corresponding to a cross-section defined by a desired curved surface of the lens and the substrate surface or of a polygon approximated thereto as shown in FIG. 1C. The photo-mask 13 used here, if it has a plurality of the Cr pattern 12 which are one-dimensionally or two-dimensionally arranged, can be used in production of a micro lens array, and the micro lens array is very high in dimensional accuracy since it is produced by application of the lithography.

Figure 1D:
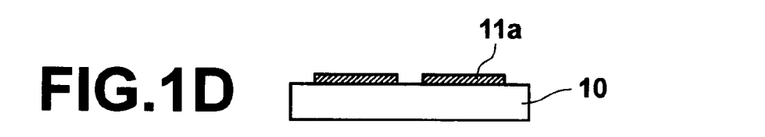

Then by developing the resist 11 for a predetermined time with an alkaline developer, rinsing it in pure water and drying it, a resist pattern 11a corresponding to the Cr pattern 12 is left on the substrate 10 as shown in FIG. 1D.

Figure 2:
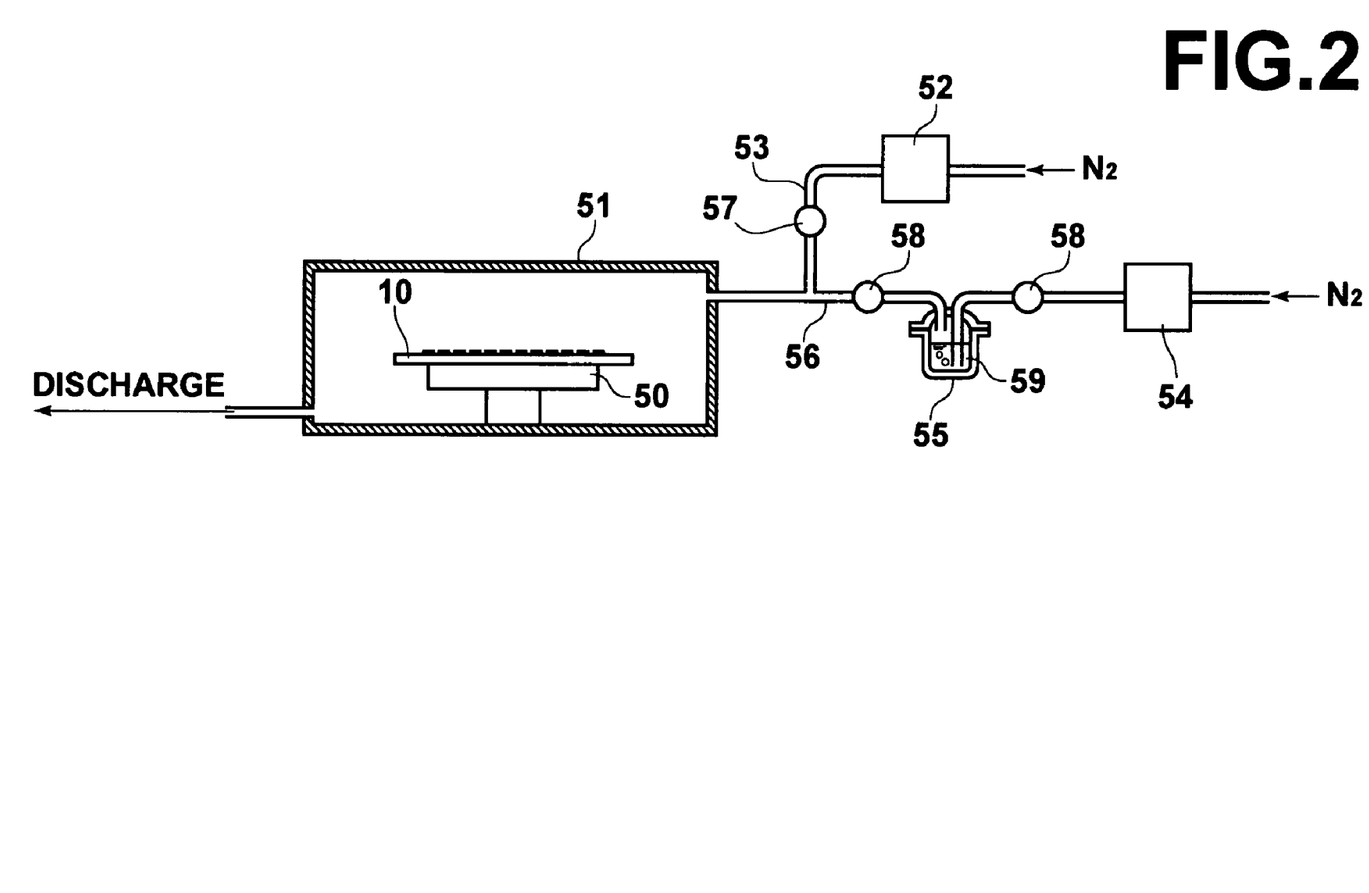
FIG. 2 is a schematic view showing an example of an apparatus for carrying out the steps shown in FIGS. 1A to 1G.

Then, the solvent vapor treatment where the solvent is absorbed by the resist pattern 11a from its gas phase is carried out on the resist pattern 11a. In this particular embodiment, for example, the apparatus shown in FIG. 2 is employed for this purpose. As shown in FIG. 2, the apparatus comprises a purge line 53 for introducing $N_2$ gas (the flow rate of which is controlled by a flow control means 52) into a solvent vapor treatment container 51, a bubbler 55 which blows into solvent $N_2$ gas the flow rate of which is controlled by a flow control means 54, a solvent vapor introduction line 56 for introducing vapor of solvent into the solvent vapor treatment container 51, and valves 57 and 58 for connecting and disconnecting the purge line 53 and the solvent vapor introduction line 56 to and from the solvent vapor treatment container 51. Further, this apparatus may be added with a heater for heating the bubbler 55 as desired and a trap for removing the solvent vapor from the discharge of the solvent vapor treatment container 51.

The treatment by the apparatus will be described next. The substrate 10 provided with the resist pattern 11a is held on a substrate holding table 50 in the solvent vapor treatment container 51 and then $N_2$ gas is introduced into the container 51 through the purge line 53, thereby replacing the gas in the container 51 with the $N_2$ gas. By this, danger of explosion upon subsequent introduction of the solvent vapor can be avoided.

Figure 1E:
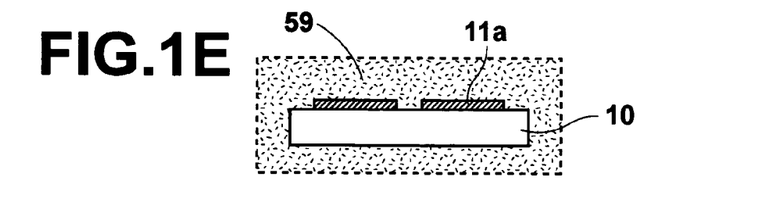

Then resist thinner (ethyl lactate) 59 which is solvent of the resist pattern 11a is introduced into the bubbler 55 and while a predetermined amount of $N_2$ gas is flowed, the resist thinner 59 is introduced into the solvent vapor treatment container 51. If the resist thinner 59 is heated at this time, higher vapor pressure can be obtained and the time required to the treatment can be shortened. When this state is kept for a predetermined time as shown in FIG. 1E, the resist pattern 11a absorbs the evaporated resist thinner 59 and is dissolved. The inside of the solvent vapor treatment container 51 is kept at the room temperature and the dissolution progresses at a low temperature of 20 to 25° C.

Figure 1F:
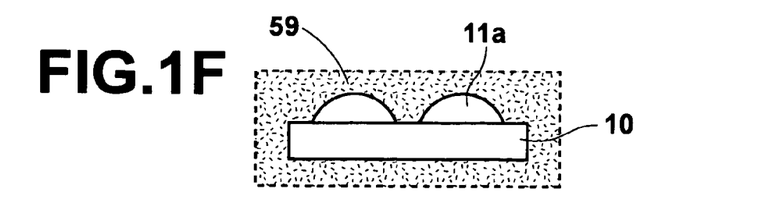

After the solvent vapor treatment described above, the resist pattern 11a absorbs the resist thinner 59 and the dissolved resist pattern 11a comes to have fluidity, whereby the surface of the resist pattern 11a becomes convex under the surface tension as shown in FIG. 1F.

After carrying out the solvent vapor treatment for a predetermined time and confirming that the surface of the resist pattern 11a becomes convex, $N_2$ gas is introduced into the container 51 through the purge line 53, thereby replacing the gas in the container 51 with the $N_2$ gas. The resist thinner 59 absorbed by the resist pattern 11a is gradually dried and evaporated at this time and only the solid components are left there, whereby a desired lens shape is formed. The solid components left at this time depend upon the volume of the resist pattern 11a and does not depend upon the amount of the resist thinner 59 absorbed by the resist pattern 11a. If drying here is insufficient, the solvent abruptly evaporates during heating to be carried out later to cause generation of bubbles and/or deformation of the lens shape.

Figure 1G:
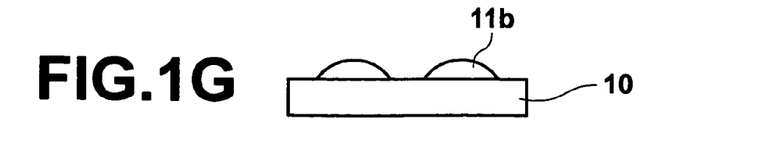

Thereafter, the substrate 10 is taken out from the solvent vapor treatment container 51 and heated to 80 to 120° C. by the use of a hot plate or a clean oven to remove the residual solvent. Further, the substrate 10 is heated to 150 to 200° C. to solidify the resist pattern 11a. In this manner, highly hard micro lenses 11b are formed on the substrate 10 as shown in FIG. 1G.

In this embodiment, the resist 11 is employed as a material of the lens. However, when there is a fear that light absorbance by the photosensitive material of the resist (naphthoquinonediazido) affects the lens performance, the influence on the lens performance can be avoided by projecting ultraviolet rays onto the entire area of the substrate 10 after one of the steps described above. Further, though the substrate 10 is heated to solidify the resist pattern 11a in the last step in this embodiment, the resist pattern 11a may be solidified by another treatment such as projection of ultraviolet rays. If there gives rise to no problem in the lens performance, the solidifying treatment may be abbreviated.

Though phenolic-novolak-based resist 11 is employed in this embodiment, resist based on acrylic resin, epoxy resin or the like or a pattern formed by resin such polyethylene, polystyrene, polycarbonate or the like may be employed to produce a micro lens in accordance with the method of the present invention.

Further, though a closed system solvent vapor treatment apparatus is employed in this embodiment, an open system solvent vapor treatment apparatus may be employed by providing a solvent vapor recovery means. In this case, a continuous treatment can be carried out.

Figure 3:
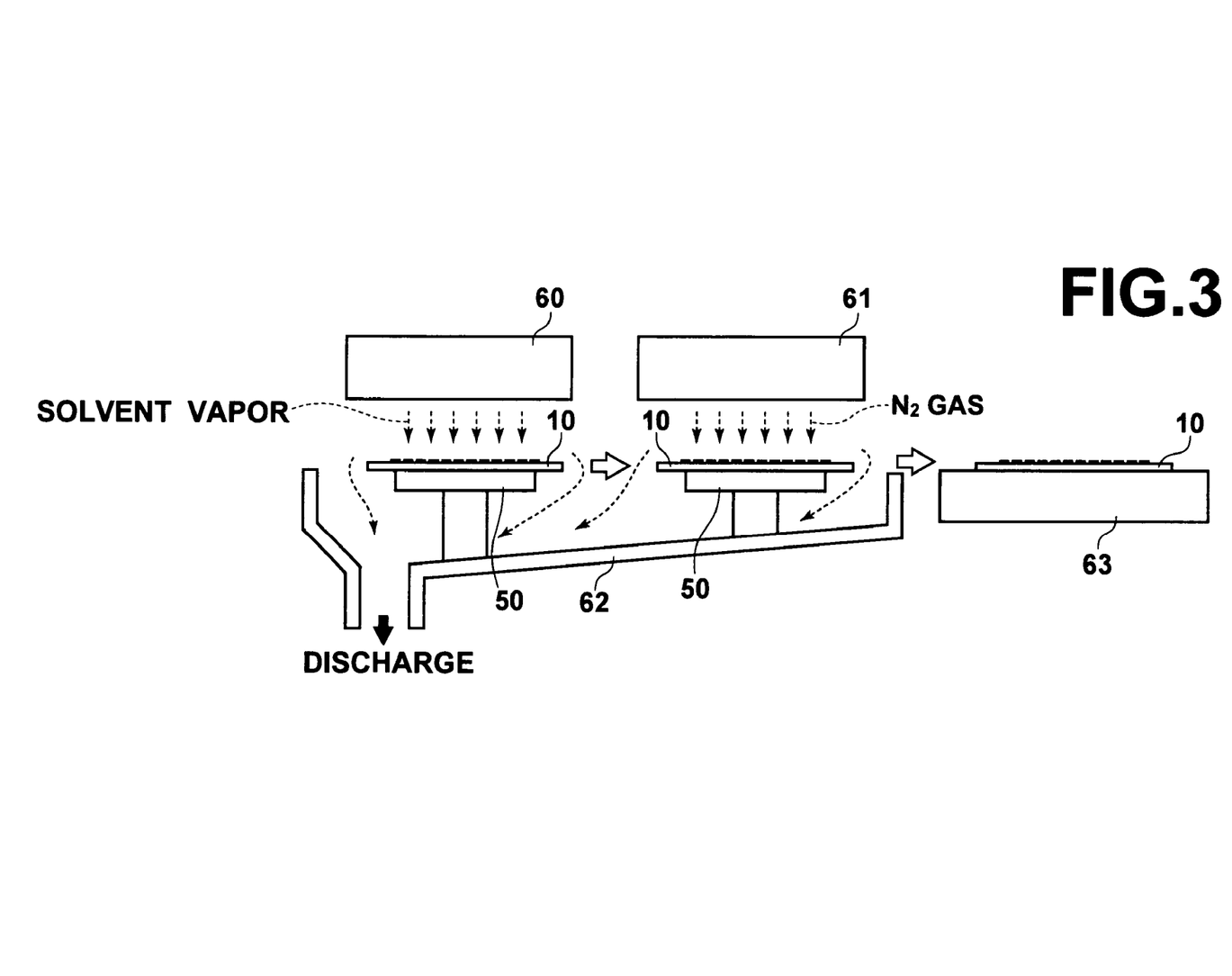
FIG. 3 is a schematic view showing another example of an apparatus for carrying out the steps shown in FIGS. 1A to 1G, FIGS. 4A to 4F are views for illustrating the steps of a method of producing a micro lens in accordance with a second embodiment of the present invention.

FIG. 3 shows an example of the open system solvent vapor treatment apparatus. In FIG. 3, the elements analogous to those shown in FIG. 2 are given the same reference numerals, and will not be described unless necessary (the same in the following). The apparatus shown in FIG. 3 is provided with a pair of substrate holding tables 50, a first blowing means 60 which blows the solvent vapor on the substrate 10 held on one of the substrate holding tables 50, a second blowing means 61 which blows the solvent vapor on the substrate 10 held on the other substrate holding table 50, a draft chamber 62 which accommodates therein the two substrate holding tables 50 and communicates with a discharge means (not shown) at a lower portion thereof, and a hot plate 63 which is disposed outside the draft chamber 62 and heats the substrate 10.

When using the apparatus, the substrate 10 on which the resist pattern 11a has been formed is held on the left substrate holding table 50 and solvent vapor is blown on the substrate 10. Then the substrate 10 the surface of the resist pattern 11a on which has become convex is held on the right substrate holding table 50. Then the substrate 10 is dried while blowing $N_2$ gas on the substrate 10, whereby the resist thinner 59 absorbed by the resist pattern 11a is gradually evaporated with only the solid components left there and a desired lens shape is formed by the resist pattern 11a.

When the substrate 10 is placed on the hot plate 63 and the resist pattern 11a is solidified by heating the substrate 10, for instance, to 150 to 200° C., highly hard micro lenses 11b are formed on the substrate 10.

With the method of this embodiment described above, as well as aspheric lenses, toric lenses where the curvature in a cross-section parallel to the optical axis differs depending on the orientation, which is difficult in refractive index profile lenses by the isotropic etching or the impurity diffusion, can be produced by simply shaping the resist pattern 11a into substantially an ellipsoid or a polygon approximated thereto. This is true of the embodiments to be described hereinbelow.

In the method described above, the lens shape is formed by the use of the surface tension of the resist pattern 11a having fluidity and accordingly, the lens shape becomes apt to be affected by the gravity as the lens size is increased. Taking into account this fact, the method of this embodiment is practically suitable for producing micro lenses whose diameter is about 1 to 100 μm. This is true of the embodiments to be described hereinbelow.

Further, in the method described above, since the resist pattern 11a absorbs the solvent and bulges, the adjacent micro lenses are brought into contact with each other and the regular curved lens surfaces cannot be formed if the micro lenses are arranged in an array where the pitches of the micro lenses are substantially equal to L when H/L>½, where L represents the length of the lens in a direction perpendicular to the optical axis and H represents the height of the lens in a direction of the optical axis. Accordingly, when producing a micro lens array, it is necessary to determine the dimensions of L and H taking into account this fact. This is true of the embodiments to be described hereinbelow.

Second Embodiment

A method of producing a micro lens in accordance with a second embodiment of the present invention will be described with reference to FIGS. 4A to 4F, hereinbelow. A resist pattern 11a of phenolic novolak series is formed on a $SiO_2$ glass substrate 10 in the same manner as in the first embodiment described above as shown in FIG. 4A. That is, FIG. 4A corresponds to FIG. 1D.

Figure 4A:
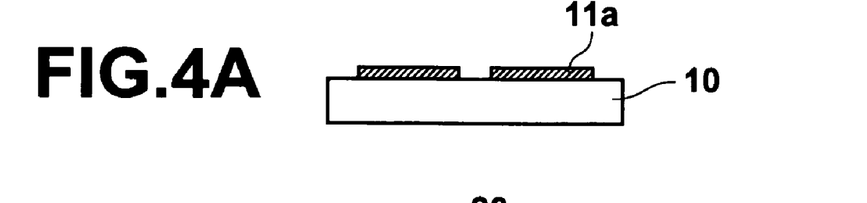
Figure 4B:
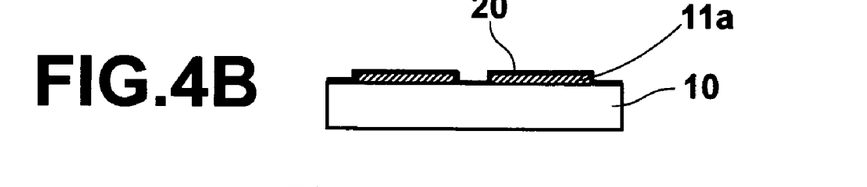

Then the surface of the substrate 10 on which the resist pattern 11a has been formed is treated with oxygen plasma. In this embodiment, descum ashing is carried out with a plane-parallel plate oxygen plasma ashing apparatus. The treating conditions are, for instance, as follows.

high frequency power: 10 to 50 W, treating time: 10 to 60 s, chamber pressure: 1 to 30 Pa Next, the surface of the substrate 10 is coated with liquid repellent coating. In this embodiment, a silane coupling agent of fluorocarbon series (Optool DSX: Daikin Industries, Ltd.) is employed as the coating material, and the liquid repellent coating 20 is provided in thickness of 1 to 100 nm by spin coating or dipping as shown in FIG. 4B. Then the substrate 10 washed in rinsing solution comprising fluorine solvent which does not dissolve the resist pattern 11a and is dried.

Figure 5:
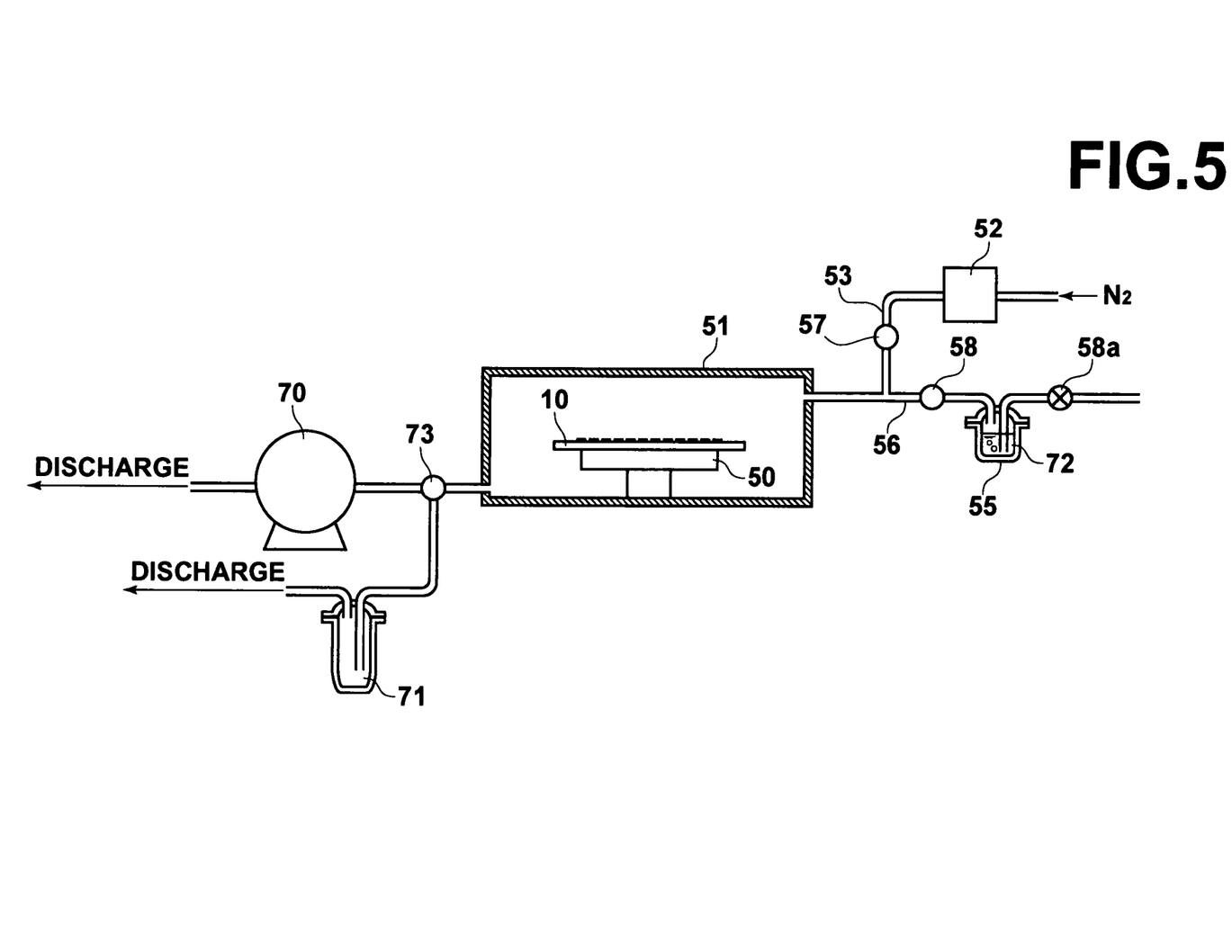
FIG. 5 is a schematic view showing an example of an apparatus for carrying out the steps shown in FIGS. 4A to 4F, FIGS. 6A to 6C are views for illustrating the steps of a method of producing a micro lens in accordance with a third embodiment of the present invention.

Then, the solvent vapor treatment where the solvent is absorbed by the resist pattern 11a from its gas phase is carried out on the resist pattern 11a. In this particular embodiment, for example, the apparatus shown in FIG. 5 is employed for this purpose. As shown in FIG. 5, the apparatus comprises a solvent vapor treatment container 51 which accommodates therein a substrate holding table 50 for holding a substrate 10 and is for accomplishing the solvent vapor treatment, a purge line 53 for introducing $N_2$ gas (the flow rate of which is controlled by a flow control means 52) into the solvent vapor treatment container 51, a bubbler 55 which blows into solvent $N_2$ gas the flow rate of which is controlled by a flow control valve 58a, a solvent vapor introduction line 56 for introducing vapor of solvent into the solvent vapor treatment container 51, valves 57 and 58 for connecting and disconnecting the purge line 53 and the solvent vapor introduction line 56 to and from the solvent vapor treatment container 51, a pump 70 which evacuates the inside of the solvent vapor treatment container 51, and a trap 71 for removing the solvent vapor from the discharge of the solvent vapor treatment container 51. Further, this apparatus may be added with a heater for heating the bubbler 55 as desired.

The treatment by the apparatus will be described next. The substrate 10 provided with the resist pattern 11a is held on the substrate holding table 50 in the solvent vapor treatment container 51 and evacuates by the pump 70 the inside of the solvent vapor treatment container 51 to, for instance, a pressure not higher than 1 kPa with both the purge line 53 and the solvent vapor introduction line 56 closed. Then acetone 72 which can dissolve the resist is introduced into the bubbler 55, and the valve 58 is opened with the flow rate of $N_2$ gas in the solvent vapor introduction line 56 nullified. By this, the acetone 72 boils and concentrated acetone vapor is introduced into the solvent vapor treatment container 51.

Figure 4C:
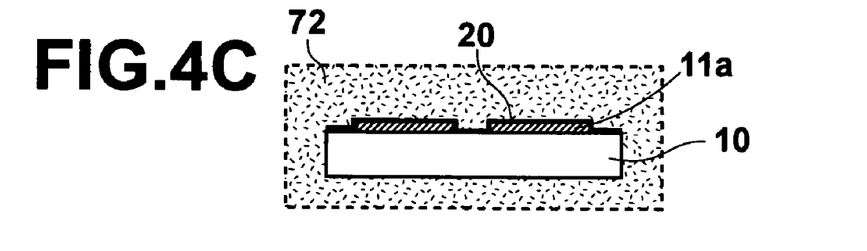

When this state is kept for a predetermined time as shown in FIG. 4C, the resist pattern 11a absorbs the evaporated acetone 72 and is dissolved. The inside of the solvent vapor treatment container 51 is kept at the room temperature and the dissolution progresses at a low temperature of 20 to 25° C.

Figure 4D:
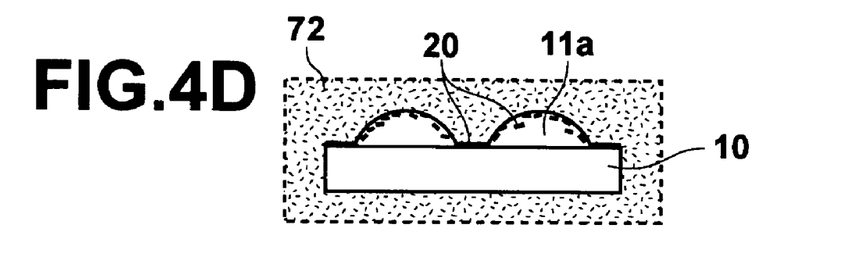

After the solvent vapor treatment described above, the resist pattern 11a which has absorbed the acetone 72 and has been dissolved comes to have fluidity, whereby the surface of the resist pattern 11a becomes convex under the surface tension as shown in FIG. 4D.

Figure 4E:
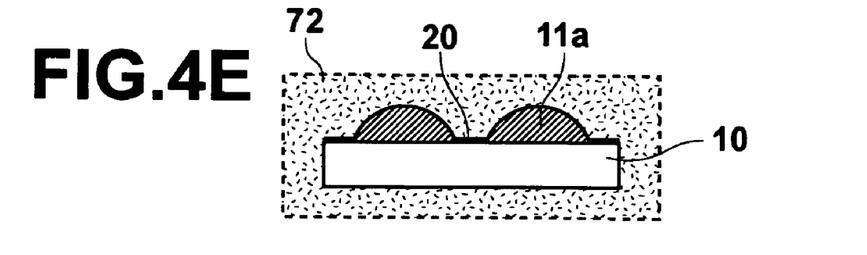
Figure 4F:
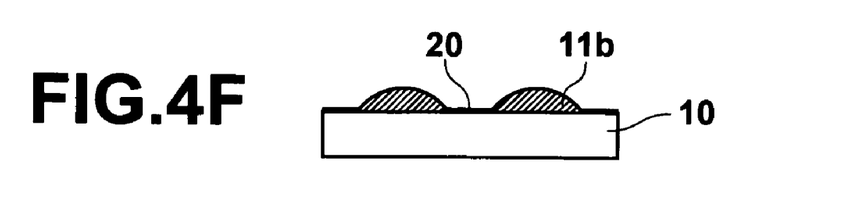

At this time, the liquid repellent coating 20 which has adhered to the surface of the resist pattern 11a is trapped into the resist pattern 11a as shown in FIG. 4E.

After carrying out the solvent vapor treatment for a predetermined time and confirming that the surface of the resist pattern 11a becomes convex and the liquid repellent coating 20 is trapped in the resist pattern 11a, the solvent vapor introduction line 56 is closed and the valve 57 is opened to introduce $N_2$ gas into the container 51, thereby replacing the gas in the container 51 with the $N_2$ gas. At this time, a three-way valve 73 is operated to switch the discharge line to that passing through the trap 71 to remove acetone vapor from discharge of the solvent vapor treatment container 51. When the substrate 10 is left to stand for a predetermined time in this state, the acetone 72 absorbed by the resist pattern 11a is gradually dried and evaporated and only the solid components are left there, whereby a desired lens shape is formed by the resist pattern 11a.

Thereafter, the substrate 10 is taken out from the solvent vapor treatment container 51 and heated to 80 to 120° C. by the use of a hot plate or a clean oven to remove acetone. Further, the substrate 10 is heated to 150 to 200° C. to solidify the resist pattern 11a. In this manner, highly hard micro lenses 11b are formed on the substrate 10 as shown in FIG. 4G.

In this embodiment, since the surface of the substrate 10 is coated with the liquid repellent coating 20 of a silane coupling agent of fluorocarbon series, the part of the surface of the substrate 10 except the resist pattern 11a is liquid repellent and accordingly spread of the dissolved resist pattern 11a can be prevented. The liquid repellent coating 20 is provided on the surface of the resist pattern 11a. Further, since it may be as small as not larger than 100 nm (preferably not larger than 10 nm) in thickness, the solvent vapor can penetrate into the resist pattern 11a. Further, since the liquid repellent coating 20 is formed by a silane coupling agent in this embodiment, the adherence of the liquid repellent coating 20 to the surface of the resist pattern 11a is weaker than that to the surface of the substrate 10. Accordingly, the density of the coating film of the liquid repellent coating 20 can be less on the surface of the resist pattern 11a than the surface of the substrate 10 by washing by the rinse solution after the coating, whereby penetration of the solvent vapor can be increased.

The liquid repellent coating 20 on the resist pattern 11a is broken when the resist pattern 11a absorbs the solvent and bulges. When the liquid repellent coating 20 is left on the surface of the resist pattern 11a, the curved surface corresponding thereto is deformed, which can deteriorate the lens quality. Accordingly, the solvent vapor treatment should be carried out until the liquid repellent coating 20 is trapped into the resist pattern 11a. By reducing the thickness of the liquid repellent coating 20, the relative amount of the liquid repellent coating 20 to the total volume of the lens can be suppressed not to greatly affect the refractive index of the lens.

Further, since in this embodiment, the surface of the substrate 10 is treated by ashing with oxygen plasma, the organic material can be removed from the surface of the substrate 10, if any, and the liquid repellent coating 20 can firmly adhere to the surface of the substrate 10.

In the case where the surface of the substrate 10 is coated with liquid repellent coating as in this embodiment, acetone which is small in molecular weight and easily penetrates the liquid repellent coating is especially useful as the solvent. Though, in this embodiment, a coating agent of fluorine series is employed, other coating agents such as a coating agent of silicone series may be employed so long as the coating is repellent to the dissolved resist and permeable to the solvent vapor. Also in this case, the result similar to this embodiment can be obtained.

Third Embodiment

Figure 6A:
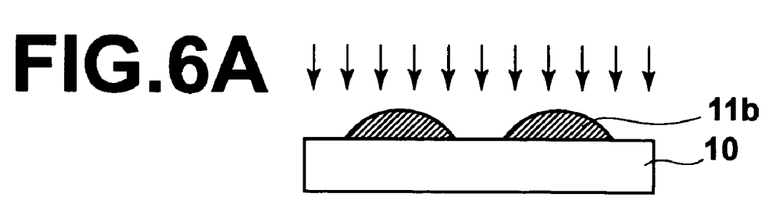
Figure 6B:
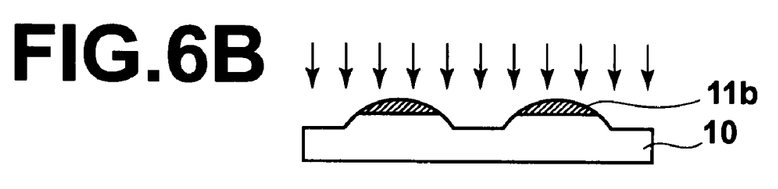
Figure 6C:
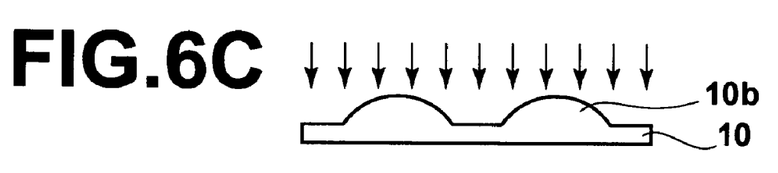

A method of producing a micro lens in accordance with a third embodiment of the present invention will be described with reference to FIGS. 6A to 6C, hereinbelow. In this embodiment, the shape of lens-like portions formed on a substrate is transferred to the substrate and micro lenses of the same material as the substrate are formed on the substrate.

A transparent $SiO_2$ glass substrate 10 on which micro lenses 11b are formed is first prepared by the method described above in the first or second embodiment. In this embodiment, the solidifying treatment at high temperature on the micro lenses 11b need not be necessarily carried out. Though referred to as "the micro lenses 11b" here, since it is not necessary for the lens-like portions formed on the substrate 10 to operate as lenses, the lens-like portions may be formed by opaque resin.

The substrate 10 is set to an induction coupling plasma etching apparatus (ICP) and anisotropic etching is carried out thereon. As the etching gas, fluorine gas such as $CF_4$, $CHF_3$, $SF_6$ or the like or gas added thereto with $O_2$ is employed in an amount which will provide substantially 1:1 etching rate of the micro lenses 11b (that is, the positive resist 11 of phenolic novolak series) and the $SiO_2$ glass substrate 10. In this case, as shown in FIG. 6B, etching is initiated later as the thickness of the micro lenses 11b on the substrate 10 increases. Finally, the substrate 10 is etched as if the shape of the micro lenses 11b is transferred to the substrate 10 and micro lenses 10b are formed on the substrate 10 as shown in FIG. 6C.

After confirming that the plasma light emission spectrum due to the decomposition product of the resist 11 is extinguished by the use of an optical end point detector, over-etching is carried out for a predetermined time and then the treatment is ended. In this manner, micro lenses 10b of the same material as the substrate are formed on the $SiO_2$ glass substrate 10.

Though the substrate 10 is formed of $SiO_2$ glass, the shape of the micro lenses can be transferred by suitably selecting the etching conditions even if the substrate 10 is formed of resin such as acrylic resin, epoxy resin, polycarbonate or the like or other optical crystals.

Further, it is possible to produce aspheric lenses where the curvature in a cross-section parallel to the optical axis locally differs by setting the etching rates of the micro lenses 11b and the $SiO_2$ glass substrate 10 in the dry etching or by changing the etching conditions such as the kind or compositions of the etching gas, the high frequency power, the bias voltage applied to the substrate 10, the chamber pressure or the like with time during the dry etching.

The performance or the function of the lens can be improved by forming on the lens surfaces or the surface of the substrate 10 antireflection coating comprising a single film or a laminated film of a dielectric material or a light shielding pattern of Cr or the like and making it an alignment mark with an aperture or other members after the steps described above.

Fourth Embodiment

A method of producing a micro lens in accordance with a fourth embodiment of the present invention will be described with reference to FIGS. 7A to 7E, hereinbelow. In this embodiment, the shape of lens-like portions formed on a substrate is transferred to another member and micro lenses are formed with the member used as a lens forming mold.

Figure 7A:
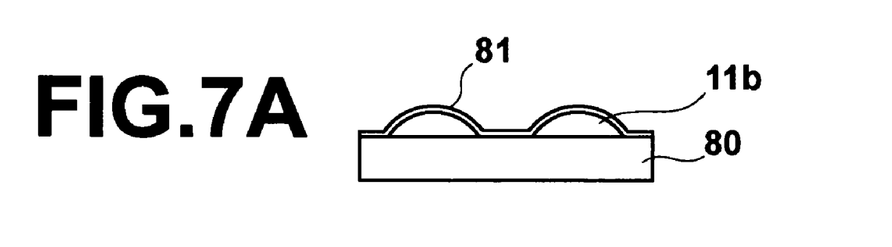
FIGS. 7A to 7E are views for illustrating the steps of a method of producing a micro lens in accordance with a fourth embodiment of the present invention.

An Si substrate 80 on which micro lenses 11b are formed is first prepared by the method described above in the first or second embodiment. In this embodiment, the solidifying treatment at high temperature on the micro lenses 11b need not be necessarily carried out. Though referred to as "the micro lenses 11b" here, since it is not necessary for the lens-like portions formed on the substrate 80 to operate as lenses, the lens-like portions may be formed by opaque resin. Further, the substrate need not be transparent and may be an Si substrate as in this embodiment or a flat metal plate.

The substrate 80 is set to a plane-parallel plate oxygen plasma ashing apparatus and ashing is carried out thereon. The treating conditions are, for instance, as follows.

high frequency power: 10 to 50 W, treating time: 10 to 60 s, chamber pressure: 1 to 30 Pa Then Ni film 81 is formed over the substrate 80 and the micro lenses 11b in a thickness of 50 to 300 nm by sputtering.

Figure 7B:
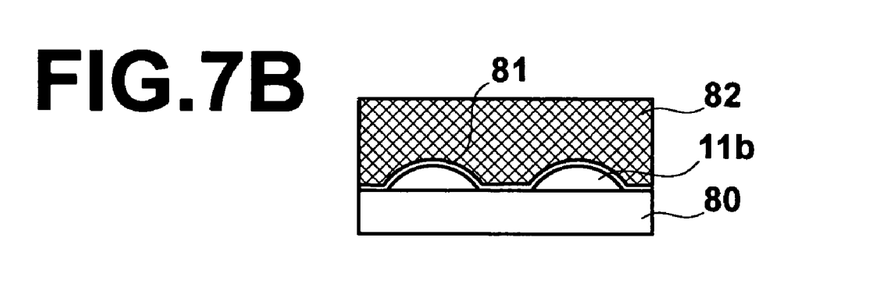

Nickel electroforming is carried out on the substrate 80 next. The substrate 80 is dipped in a sulfamine acid nickel plating bath prepared under predetermined conditions and is wired so that the depolarized nickel becomes an anode and the sputter Ni film 81 on the substrate 80 becomes a cathode, and then energized, for instance, at a current density of 0.1 to 20 $A/dm^2$ (=10 to 2000 $A/m^2$) to carry out electrolytic plating. By this, Ni separates out on the substrate 80 and a Ni plating layer 82 is formed as shown in FIG. 7B. In this embodiment, the nickel electroforming is continued until the thickness of the Ni plating layer 82 becomes, for instance, 0.1 to 3 mm.

Figure 7C:
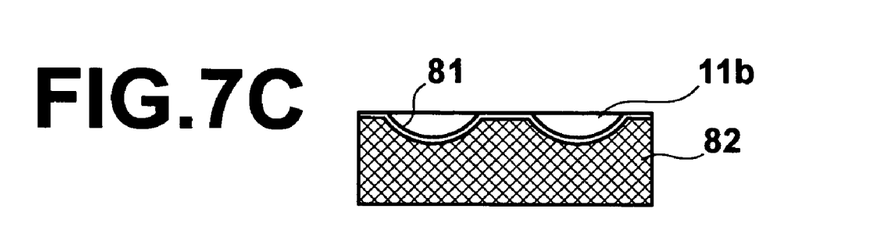

After the nickel electroforming, the substrate 80 is taken out from the plating bath and is washed and a separating Ni mold (a Ni plating layer) is peeled off the substrate 80 as shown in FIG. 7C.

Figure 7D:
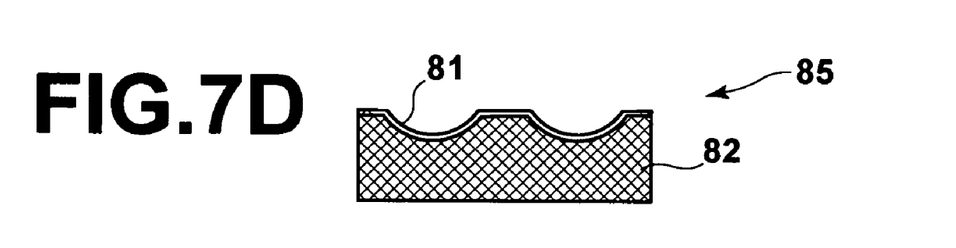

Then, the resist (micro lenses 11b) adhering to the electroformed Ni mold 82 is removed by remover of a family of the solvent and the mold 82 is washed. This state is shown in FIG. 7D. Finally, the back side of the electroformed Ni mold 82 is machined, e.g., polished and/or ground, to form a micro lens forming mold 85.

Figure 7E:
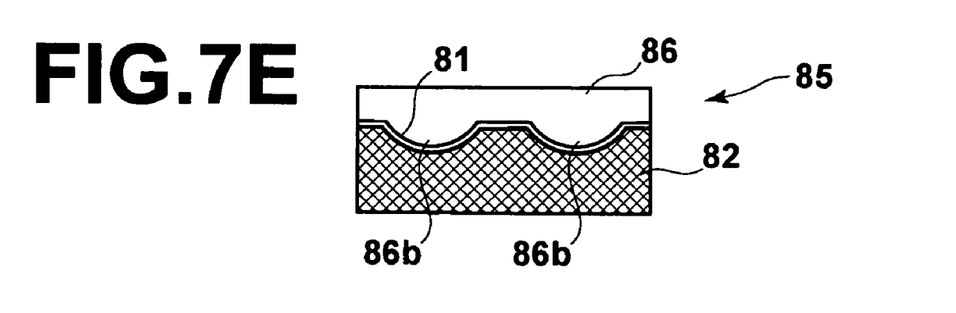

The micro lens forming mold 85 thus formed is obtained by transferring a reverse shape of the micro lenses 11b to the electroformed Ni mold 82. Accordingly, by casting a transparent member 86 such as of transparent resin or the like into the micro lens forming mold 85 as shown in FIG. 7E and removing it from the mold 86 after drying and solidifying, micro lenses 86b the same as the micro lenses 11b in shape are formed on the transparent member 86.

When such a micro lens forming mold 85 is employed, micro lenses can be produced in a large number at low cost. Though electroformed mold 82 is formed of nickel in this embodiment, electroformed mold may be formed of copper plating, plating of alloy of nickel and cobalt, or the like.

What is claimed is:

1. A method of producing a micro lens comprising the steps of forming a transparent resin layer on a transparent substrate in a desired pattern, causing the resin layer to absorb from its surroundings solvent which dissolves the resin so that the resin layer has fluidity and the surface of the resin layer becomes convex under the surface tension, the dissolution of the resin progresses at room temperature, then drying the solvent to use the convex portion of the resin as a lens, and in which the surface of the substrate is coated with coating exhibiting liquid repellency to the resin which has absorbed the solvent and has been dissolved, from the resin layer side after forming the resin layer in a desired pattern and before causing the resin layer to absorb the solvent.

2. A method as defined in claim 1 in which a lens where the curvature in a cross-section parallel to the optical axis differs depending on the orientation is produced by patterning the resin layer into an ellipsoid or a polygon approximated thereto.

3. A method as defined in claim 1 in which the resin is held in the atmosphere of the solvent until the coating adhering to the surface of the resin is taken in the inside of the resin when causing the resin layer to absorb the solvent.

4. A method of producing a micro lens comprising the steps of forming a resin layer on a transparent substrate in a desired pattern, causing the resin layer to absorb from its surroundings solvent which dissolves the resin so that the resin layer has fluidity and the surface of the resin layer becomes convex under the surface tension, the dissolution of the resin progresses at room temperature, then drying the solvent, dry-etching the substrate from the side on which the resin remains, thereby transferring the convex shape of the resin layer to the substrate, forming a lens on the substrate, and in which the surface of the substrate is coated with coating exhibiting liquid repellency to the resin which has absorbed the solvent and has been dissolved, from the resin layer side after forming the resin layer in a desired pattern and before causing the resin layer to absorb the solvent.

5. A method as defined in claim 4 in which an aspheric lens is produced by changing the etching rates of the resin and the substrate by continuously or stepwise changing etching conditions with time during the dry etching.

6. A method as defined in claim 4 in which a lens where the curvature in a cross-section parallel to the optical axis differs depending on the orientation is produced by patterning the resin layer into an ellipsoid or a polygon approximated thereto.

7. A method as defined in claim 4 in which the resin is held in the atmosphere of the solvent until the coating adhering to the surface of the resin is taken in the inside of the resin when causing the resin layer to absorb the solvent.

8. A method of producing a micro lens comprising the steps of forming a resin layer on a substrate in a desired pattern, causing the resin layer to absorb from its surroundings solvent which dissolves the resin so that the resin layer has fluidity and the surface of the resin layer becomes convex under the surface tension, the dissolution of the resin progresses at room temperature, then drying the solvent, subsequently transferring the convex shape of the resin layer to another member to form a lens forming mold, forming a lens by molding a transparent member on the basis of the lens forming mold, and in which the surface of the substrate is coated with coating exhibiting liquid repellency to the resin which has absorbed the solvent and has been dissolved, from the resin layer side after forming the resin layer in a desired pattern and before causing the resin layer to absorb the solvent.

9. A method as defined in claim 8 in which a lens where the curvature in a cross-section parallel to the optical axis differs depending on the orientation is produced by patterning the resin layer into an ellipsoid or a polygon approximated thereto.

10. A method as defined in claim 9 in which the resin is held in the atmosphere of the solvent until the coating adhering to the surface of the resin is taken in the inside of the resin when causing the resin layer to absorb the solvent.

11. A method of producing a micro lens forming mold comprising the steps of forming a resin layer on a substrate in a desired pattern, causing the resin layer to absorb from its surroundings solvent which dissolves the resin so that the resin layer has fluidity and the surface of the resin layer becomes convex under the surface tension, the dissolution of the resin progresses at room temperature, then drying the solvent, and subsequently transferring the convex shape of the resin layer to another member to form a lens forming mold, and in which the surface of the substrate is coated with coating exhibiting liquid repellency to the resin which has absorbed the solvent and has been dissolved, from the resin layer side after forming the resin layer in a desired pattern and before causing the resin layer to absorb the solvent.

12. A method as defined in claim 11 in which the resin is held in the atmosphere of the solvent until the coating adhering to the surface of the resin is taken in the inside of the resin when causing the resin layer to absorb the solvent.

13. A method as defined in claim 1, further comprising projecting ultraviolet rays onto an entirety of a surface to expose the entirety of the transparent substrate separate from forming the desired pattern of the resin layer.

14. A method as defined in claim 1, wherein the drying the solvent comprises blowing inert gas onto the transparent substrate.

15. A method as defined in claim 1, further comprising projecting ultraviolet rays onto a pattern mask of a closed curve corresponding to a desired cross-section of a lens curve.

16. A method as defined in claim 4, further comprising projecting ultraviolet rays onto an entirety of a surface of the transparent substrate separate from forming the desired pattern of the resin layer.

17. A method as defined in claim 4, wherein the drying the solvent comprises blowing inert gas onto the transparent substrate.

18. A method as defined in claim 4, further comprising projecting ultraviolet rays onto a pattern mask of a closed curve corresponding to a desired cross-section of a lens curve.

19. A method as defined in claim 1, wherein dissolution of the resin progresses at room temperature within a range from 20° C. to 25° C.

20. A method as defined in claim 4, wherein dissolution of the resin progresses at room temperature within a range from 20° C. to 25° C.

* * * * *